United States Patent
Rodriguez et al.

[15] 3,681,340
[45] Aug. 1, 1972

[54] 1,3-BENZODIAZEPINES

[72] Inventors: Herman Robert Rodriguez, 201 E. 21st Apt. 20 D, New York, N.Y. 10010; George De Stevens, 2 Warwick Road, Woolard Park, Summit, N.J. 07901

[22] Filed: Feb. 12, 1968

[21] Appl. No.: 704,517

Related U.S. Application Data

[63] Continuation-in-part of Ser. No. 649,828, June 29, 1967, abandoned, which is a continuation-in-part of Ser. No. 630,520, April 13, 1967, abandoned.

[52] U.S. Cl......260/239 BD, 260/239 A, 260/239 E, 260/239.3 B, 260/243 B, 260/247.1, 260/247.2 A, 260/247.5 B, 260/268 BC, 260/293.59, 260/309, 260/326.3, 260/326.5 S, 260/326.5 SF, 260/326.81, 424/244, 424/246, 424/248, 424/250, 424/267, 424/274
[51] Int. Cl.....C07d 53/04, C07d 57/00, C07d 99/04
[58] Field of Search........260/239 BD, 293 D, 3, 309, 260/239.3, 294.7 G, 268 R

[56] References Cited

UNITED STATES PATENTS 3,474,090  10/1969  Wright......................260/239.3

OTHER PUBLICATIONS

De Stevens et al., J. Am. Chem. Soc., Vol. 83, pages 3087–3091 (1961)

*Primary Examiner*—Alton D. Rollins
*Attorney*—Harry Goldsmith, Joseph G. Kolodny and Bryant W. Brennan

[57] ABSTRACT

4,5-Dihydro-3H-1,3-benzodiazepines, e.g., those of the formula

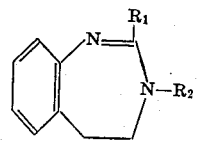

$R_1$=H, free or etherified OH or SH, amino, or an aliphatic, araliphatic or aromatic radical
$R_2$=H, acyl or aliphatic, araliphatic or aromatic radical N-oxides, quaternaries and salts thereof exhibit central nervous system depressing and coronary dilatating effects.

4 Claims, No Drawings

1,3-BENZODIAZEPINES

CROSS-REFERENCES TO RELATED APPLICATIONS

This is a continuation-in-part of application, Ser. No. 649,828, filed June 29, 1967, which in turn is a continuation-in-part of application, Ser. No. 630,520, filed Apr. 13, 1967, both of which are now abandoned.

SUMMARY OF THE INVENTION

The present invention concerns and has for its object the provision of new 4,5-dihydro-3H-1,3 benzodiazepines, more particularly those of the Formula I

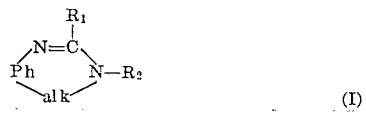

in which Ph stands for a 1,2-phenylene radical, $R_1$ for hydrogen, free or etherified hydroxy or mercapto, an amino group or an aliphatic, araliphatic or aromatic radical, $R_2$ for hydrogen, the acyl radical of a carboxylic acid, an aliphatic, araliphatic or aromatic radical and alk for lower alkylene, aralkylene, alkanoylene or aralkanoylene separating Ph from the nitrogen atom by two ring-carbon atoms, N-oxides, quaternaries and salts thereof, as well as of corresponding pharmaceutical compositions and methods for the preparation of these products. Said compositions are useful as analgesics and tranquilizers, primarily as cardiovascular agents, for example in the treatment of congestive heart failure.

DESCRIPTION OF THE PREFERRED EMBODIMENTS

The 1,2-phenylene radical Ph is unsubstituted or substituted by one or more than one of the same or different substituents attached to any of the positions available for substitution. Such substituents are, for example, lower aklyl, such as methyl, ethyl, n- or i-propyl or -butyl, free, etherified or esterified hydroxy or mercapto, for example, lower alkoxy, alkylenedioxy, aralkoxy or alkylmercapto, such as methoxy, ethoxy, n- or i-propoxy or -butoxy, methylenedioxy, 1,1- or 1,2-ethylenedioxy, benzyloxy, methyl- or ethylmercapto, or halogeno, such as fluoro, chloro or bromo, trifluoromethyl, nitro or amino, such as di-lower alkylamino, e.g. dimethylamino or diethylamino, free or esterified carboxy, such as carbo-lower alkoxy, e.g. carbethoxy, or di-lower alkylsulfamoyl, e.g. dimethylsulfamoyl. The term "lower," referred to above and hereinafter in connection with organic radicals or compounds respectively, defines such with up to 7, preferably up to 4, carbon atoms. Preferred 1,2-phenylene radicals Ph are 1,2-phenylene, (lower alkyl)-1,2-phenylene, mono- or di-(lower alkoxy)-1,2-phenylene, (lower alkoxy, hydroxy)-1,2-phenylene, (halogeno)-1.2-phenylene, (trifluoromethyl)-1,2-phenylene, (nitro)-1,2-phenylene or (di-lower alkylamino)-1,2-phenylene.

An aliphatic radical $R_1$ and/or $R_2$ is, for example, lower alkyl, e.g. that mentioned above, but also straight or branched pentyl, hexyl or heptyl bound in any position, or lower alkenyl, e.g. allyl, methallyl or 3-butenyl, cycloalkyl, cycloalkenyl, cycloalkyl-lower alkyl or cycloalkenyl-lower alkyl, preferably such having three to seven ring- and one to four chain-carbon atoms, e.g. cyclopropyl, cyclopentyl, cyclohexyl, 1-cyclopentenyl, 3-cyclohexenyl, cyclopropylmethyl, 2-cyclopentylethyl, 3,4-cyclopentadienylmethyl or 3-(3-cyclohexenyl)-propyl. These radicals may be substituted by free or esterified hydroxy groups, for example, halogen atoms, such as hydroxy- or halogeno-lower alkyl, e.g. chloromethyl, 2-hydroxy- or chloro-ethyl, or may be interrupted by heteroatoms, preferably by one oxygen, sulfur and/or nitrogen atom, such as lower alkoxy-lower alkyl, e.g. methoxymethyl, ethoxymethyl, n-propoxymethyl, 1- or 2-methoxy-, ethoxy or i-propoxy-ethyl, 1-, 2-or 3-methoxy-, ethoxy- or n-propoxy-propyl or 4-tert. butoxy-butyl, the corresponding lower alkylmercapto-lower alkyl groups, mono- or di-lower alkylamino-lower alkyl, lower alkyleneimino-lower alkyl, aza-, oxa- or thia-alkyleneimino-lower alkyl or N-lower alkyl- or phenyl-aza-alkyleneimino-lower alkyl groups with preferably four to six ring-carbon atoms and in which radicals the heteroatoms are separated by at least two carbon atoms, such as dimethylaminomethyl, 2-methylamino-, 2-dimethylamino- or 2-diethylamino-ethyl, 3-dimethylamino- or 3-diethylamino-propyl, 2-pyrrolidino-ethyl, piperidinomethyl, 3-piperidino-propyl, 2-piperazino-ethyl, 2-(4-methyl-piperazino)-ethyl, 3-(4-ethyl-piperazino)-propyl, 2-(4-phenyl-piperazino)-ethyl, 2-morpholino-ethyl or 3-thiamorpholino-propyl.

An aromatic radical $R_1$ and/or $R_2$ represents, for example, monocyclic, iso- or heterocyclic aryl, such as phenyl, pyridyl, thienyl, furyl, pyrryl, pyrazolyl or imidazolyl. They are unsubstituted or substituted by one or more than one of the same or different substituents, e.g. those mentioned for Ph. Preferred aromatic radicals are phenyl, mono- or di-(lower alkyl)-phenyl, (hydroxy)-phenyl, mono-, di- or tri-(lower alkoxy)-phenyl, (lower alkylmercapto)-phenyl, (halogeno)-phenyl, (trifluoromethyl)-phenyl, (nitro)-phenyl, (di-lower alkylamino)-phenyl, (carboxy)-phenyl, (carbo-lower alkoxy)-phenyl, (di-lower alkylsulfamoyl)-phenyl, pyridyl, (lower alkyl)-pyridyl, thienyl, (lower alkyl)-thienyl, furyl, (lower alkyl)-furyl, pyrryl, (lower alkyl)-pyrryl, pyrazolyl, (lower alkyl)-pyrazolyl, imidazolyl or (lower alkyl)-imidazolyl.

An araliphatic radical $R_1$ and/or $R_2$ is preferably monocyclic iso- or heterocyclic aryl-lower alkyl or -alkenyl, in which the aromatic portion has the above-given meaning, such as benzyl, 1- or 2-phenyl-ethyl, cinnamyl, furfuryl, thenyl or 1-imidazolyl-methyl.

An etherified hydroxy or mercapto group $R_1$ is preferably lower alkoxy or alkylmercapto, such as that mentioned above.

An amino group $R_1$ is unsubstituted or substituted, for example, by the aliphatic, araliphatic or aromatic radicals mentioned above. It preferably represents amino, mono- or di-lower alkylamino, lower alkyleneimino, mono-aza-, oxa- or thia-lower alkyleneimino, such as mono- or dimethylamino, mono- or diethylamino, mono- or di-n-propylamino, ethyleneimino, pyrrolidino, piperidino, 1,4-pentyleneimino, 2,5- or 1,6-hexyleneimino or 2,6-heptyleneimino, piperazino, N-lower alkyl-piperazino, morpholino or thiamorpholino.

An acyl radical of a carboxylic acid $R_2$ is, for example, lower alkanoyl, such as acetyl, propionyl, butyryl or pivalyl.

The moiety "alk" represents preferably 1,2-ethylene, but also 1,2-propylene, 1,2- or 2,3-butylene, 1,2- or 2,3-pentylene, 1,2-, 2,3- or 3,4-hexylene, 3,4-heptylene; 1- or 2-aryl-1,2-ethylene, 1-aryl-1,2- or 2,3-propylene, 1-aryl-1,2-butylene, 1- or 2-oxo-1,2-ethylene, 1-oxo-1,2-propylene, 1-oxo-1,2-butylene, 1-aryl-2-oxo-1,2-ethylene or 1-aryl-3-oxo-2,3-propylene, in which aryl stands for one of the above-mentioned aromatic radicals.

The quaternaries of the invention are particularly those containing additional lower alkyl or aralkyl groups, such as those mentioned above, quaternizing at least one tertiary nitrogen atom present.

The compounds of the invention exhibit valuable pharmacological properties. Apart from some analgesic effects, central nervous system depressing and skeletal muscle relaxing activity, they predominantly cause a dilatation of the coronary and femoral blood vessels and increase the contractile force of the heart, as can be demonstrated in animal tests, using mammals, for example mice, cats or dogs, as test objects. The analgesic effect can be shown, for example, in the mouse tail flick test, advantageously at subcutaneous doses between about 1 and 150 mg/kg/day, preferably between about 25 and 100 mg/kg/day, and the central nervous system depression in the jiggle cage test with mice at about the same subcutaneous dosages. The increase of the coronary blood flow and the contractile force of the heart can be demonstrated for example, in anesthetized dogs with an electromagnetic flow meter or cardiac strain gauge respectively, advantageously at oral doses between about 1 and 50 mg/kg/day, preferably between about 5 and 25 mg/kg/day. Besides their above-mentioned utility, the compounds of the invention are also valuable intermediates in the preparation of other useful products, particularly of pharmacologically active compounds.

Particularly useful are compounds of the Formula II

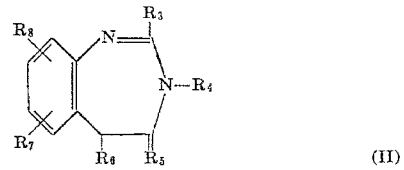

(II)

in which $R_3$ stands for hydrogen, hydroxy, mercapto, lower alkoxy, lower alkylmercapto, amino, mono- or di-lower alkylamino, lower alkyleneimino, mono-aza-, oxa- or thia-lower alkyleneimino, lower alkyl, halogeno-lower alkyl, lower alkenyl, lower alkoxy-lower alkyl, di-lower alkylamino-lower alkyl, lower alkyleneimino-lower alkyl, mono-aza-, oxa- or thia-lower alkyleneimino-lower alkyl, in which the heteroatoms are separated by at least two carbon atoms, $R_9$ or $R_9$-lower alkyl, $R_4$ for hydrogen, lower alkyl or $R_9$-lower alkyl, $R_5$ for two hydrogens, hydrogen and lower alkyl, or oxo, $R_6$ for hydrogen, lower alkyl or $R_9$, each of $R_7$ and $R_8$ for hydrogen, lower alkyl, lower alkoxy, halogeno or trifluoromethyl and $R_9$ for phenyl, mono- or di-(lower alkyl)-phenyl, (hydroxy)-phenyl, mono-, di- or tri-(lower alkoxy)-phenyl, (halogeno)-phenyl, (trifluoromethyl)-phenyl, (nitro)-phenyl, (di-lower alkylamino)-phenyl, (carboxy)-phenyl, (carbo-lower alkoxy)-phenyl or (di-lower alkylsulfamoyl)-phenyl, the N-oxide, lower alkyl-quaternaries and acid addition salts thereof.

Compounds that are especially valuable are those of the Formula III

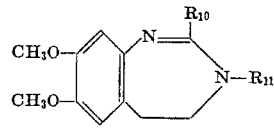

(III)

in which $R_{10}$ stands for hydroxy, mercapto, methylmercapto, amino, methyl, chloromethyl, methoxymethyl, dimethylaminomethyl, piperidinomethyl, 4-phenyl-piperazinomethyl, benzyl, mono- or dimethoxybenzyl, 2-imidazolylmethyl, phenyl, mono- or dimethyl-phenyl, i-propyl-phenyl, hydroxy-phenyl, mono-, di- or trimethoxy-phenyl, ethoxy-phenyl, fluoro-phenyl, chloro-phenyl, trifluoromethyl-phenyl, nitro-phenyl, carboxy-phenyl, carbethoxy-phenyl or dimethylsulfamyl-phenyl and $R_{11}$ for hydrogen or methyl, and therapeutically acceptable acid addition salts thereof. Outstanding are the compounds of Formula III, in which $R_{10}$ is methyl, piperidinomethyl, benzyl, 4-methoxy-benzyl, phenyl, 4-methoxy-phenyl, 3- or 4-nitro-phenyl or 3-carboxy-phenyl and $R_{11}$ is hydrogen, and therapeutically acceptable acid addition salts thereof which, when given to anesthetized dogs at oral doses between about 5 and 25 mg/kg/day show a marked increase in the coronary and femoral blood flow, and an increase of the contractile force of the heart, without causing a significant alteration of the blood pressure or heart rate. Out-standing muscle relaxant activity have the compounds of Formula III, in which $R_{10}$ is 3- or 4-nitro-phenyl and $R_{11}$ is hydrogen and therapeutically acceptable acid addition salts thereof, according to the mice tail flick and jiggle cage test at subcutaneous doses between about 25 and 100 mg/kg/day.

The compounds of the invention are prepared according to methods in themselves known, for example, the corresponding process consists in a. condensing a 2-(amino-alk)-aniline with a reactive functional derivative of a carboxylic acid, preferably those of the formulae

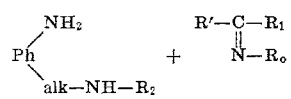

in which R' stands for lower alkoxy or amino and $R_o$ for hydrogen, lower alkyl, aralkyl or aryl, or b. ring-closing a 1-X-2-(Y-alk)-benzene, in which one of X and Y represents amino and the other a (dialkoxy- or imino-$R_1$-methyl)- amino group, preferably that of the formula

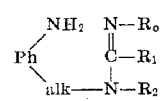 and, if desired, converting a resulting compound into another compound of the invention.

A reactive functional derivative of the carboxylic acid used in reaction a) is, for example, an ortho ester, imido ester, imido thioester, amidine or the nitrile of an aliphatic, araliphatic or aromatic carboxylic acid or a reactive carbonic acid derivative, such as an O- or S-lower alkyl-isourea or isothiourea respectively, phosgene or diimidazolylcarbonyl.

The dialkoxy- or imino-$R_1$-methylamino group present in the starting material mentioned under item b) is formed, for example, in the condensation of corresponding 1-X'-2-(Y'-alk)-benzenes, in which one of X' and Y' stands for amino and the other for potential amino, such as a nitro, azo or acylamino group, with the above-described reactive carboxylic acid derivatives. In the condensation product obtained, the potential amino group is then converted into amino, for example, by hydrogenation or hydrolysis, advantageously in an acidic medium. The following ring-closure is preferably carried out with the free bases or in the presence of a basic agent, advantageously under pyrolytic conditions.

The compounds of the invention so obtained may be converted into each other by known methods. Thus, for example, resulting compounds of Formula I in which $R_1$ is hydroxy or mercapto, may be etherified or esterified, for example with the use of reactive esters of alcohols, e.g. lower alkyl halides, or reactive functional acid derivatives, e.g. thionyl halides or phosphorus oxyhalides. Resulting 2-esters or ethers or haloalkyl compounds may be reacted with ammonia or amines in order to obtain the 2-amino or aminoalkyl compounds. Resulting primary, secondary or tertiary amines may be converted into tertiary amines or quaternaries respectively, advantageously with the use of reactive esters of corresponding alcohols, preferably lower alkanols, derived, for example, from hydrohalic or sulfonic acids, e.g. hydrochloric, hydrobromic, hydriodic, methane-, ethane- or p-toluenesulfonic acid. The N-oxides of the invention are obtained, for example, by reacting the free bases with hydrogen peroxide or a peracid, e.g. peracetic, perbenzoic or monoperphthalic acid.

The starting material used is known or, if new, may be prepared according to known methods. Thus, for example, that mentioned under item a) may be prepared either by reduction of corresponding amino- or cyano-alkyl-nitrobenzenes or α-(2-aminophenyl)-alkanoic acid nitriles or by amination or amidation of corresponding 2-(2-aminophenyl)-alkanol or α-(2-aminophenyl)-alkanoic acid derivatives respectively, e.g. the hydrohalic esters or acid halides. The reduction is carried out in the usual manner, preferably with the use of catalytically activated or nascent hydrogen, e.g. hydrogen in the presence of nickel, palladium or platinum catalysts, or hydrogen generated from metals and alcohols or acids, e.g. sodium and ethanol or zinc and hydrochloric acid. The nitriles may also be reduced with complex light metal hydrides, e.g. lithium aluminum hydride.

The aminoalkyl-nitrobenzene intermediates mentioned above can be obtained according to the following new nitration method, which is a further object of the present invention. It is generally applicable for the preparation of o-nitro-aralkanes containing in the alkyl chain a group capable of forming a nitrate, such as a basic, nitrogen containing group, e.g. prim., sec. or tert. amino, hydrazino, imino or hydrazono, free or etherified hydroxyamino or oximino, amidino, guanidino or azacyclic aryl, e.g. pyrryl, pyrazolyl, imidazolyl, pyridyl, pyridazinyl, pyrimidyl, pyrazinyl, triazinyl, and the like, the corresponding quaternary and/or hydrogenated forms. This process consists in subjecting a nitrate of an ortho-unsubstituted aralkane containing in the alkyl chain said group capable of forming a nitrate, to pyrolysis, advantageously under acidic conditions.

Accordingly, starting material used in the process of the invention can be prepared by subjecting a compound of the formula

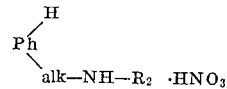

to acidic conditions and/or an elevated temperature. Generally any relatively strong acid may be used, hydrochloric and trifluoroacetic acid are particularly useful. The temperature range for this reaction is about 0° to 200°, preferably about 20° to 100°.

The starting material mentioned under item b) and precursors thereof, preferably compounds of the Formula IV

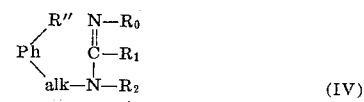

(IV)

in which R'' stands for amino or potential amino, such as a nitro, azo or acylamino group, and the other symbols have the meaning given above, is new and a further object of this invention.

Besides being intermediates in the preparation of the compounds of Formula I, the compounds of Formula (IV) also exhibit valuable pharmacological properties. Apart from hypotensive effects, they show primarily a diuretic and hypoglycemic activity, as can be demonstrated in animal tests, using mammals, for example, mice, rats or dogs, as test objects. Said diuretic and hypoglycemic effects can be demonstrated, for example, in rats, advantageously at oral doses between about 10 and 200 mg/kg/day, preferably between about 25 and 75 mg/kg/day, applied to normal, fasted, water or glucose primed or adrenalectomized rats.

Particularly useful are compounds of the Formula V,

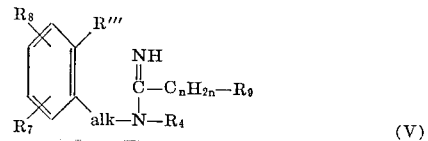

(V)

in which R''' is amino, lower alkanoylamino or nitro, alk is lower alkylene separating the benzene nucleus from the nitrogen atom by two carbon atoms, $R_4$ is hydrogen, lower alkyl or $R_9$-lower alkyl, each of $R_7$ and $R_8$ is hydrogen, lower alkyl, lower alkoxy, halogeno or trifluoromethyl, n is an integer from 0 to 4 and $R_9$ is phenyl, mono- or di-(lower alkyl)-phenyl, (hydroxy)-phenyl, mono-, di- or tri-(lower alkoxy)-phenyl, (halogeno)-phenyl, (trifluoromethyl)-phenyl, (nitro)-phenyl, (di-lower alkylamino)-phenyl, (carboxy-phenyl, (carbo-lower alkoxy)-phenyl or (di-lower alkylsulfamoyl)-phenyl, and acid addition salts thereof.

Especially valuable are the compounds of Formula VI

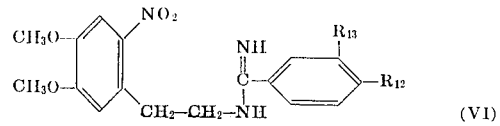

(VI)

in which each of $R_{12}$ and $R_{13}$ is hydrogen or methyl, or one thereof is hydrogen and the other is chloro or trifluoromethyl, and therapeutically useful acid addition salts thereof which, when given at oral doses between about 10 and 200 mg/kg/day, preferably between about 25 and 75 mg/kg/day to normal, fasted, glucose primed or adrenalectomized rats, show mainly hypoglycemic effects.

The compounds of Formula IV are prepared according to methods in themselves known, for example, the corresponding process consists in a. condensing compounds of the formulae

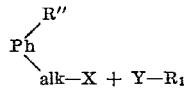

in which X stands for $R_2$—NH— and Y for a reactively converted, nitrogen containing carboxyl group or X for reactively esterified hydroxy and Y for

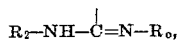

or b. reacting compounds of the formulae

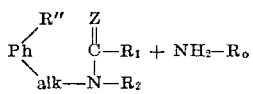

in which Z stands for oxo or thio, or a reactive functional derivative thereof, e.g. a corresponding imide halide, and converting any resulting compound into another compound of the Formula IV.

A reactively esterified hydroxy group is, for example, such derived from hydrohalic or sulfonic acids, e.g. hydrochloric, hydrobromic, hydriodic, methane-, ethane- or p-toluenesulfonic acid, whereas a compound containing a reactively converted, nitrogen containing carbonyl group is, for example, an imido ester, imido thioester, amidine or nitrile.

Any compound so-obtained, containing in the aromatic portion a substituent convertible into amino, e.g. an azo group, such group may be converted into amino, for example, by hydrogenation, advantageously in an acidic medium. Furthermore, resulting compounds containing free hydroxy, mercapto or amino groups, may be etherified, esterified or N-substituted, for example with the use of reactive esters of corresponding alcohols derived, for example, from the acids mentioned above, or with reactive functional acid derivatives, e.g. the halides or anhydrides. Resulting nitro compounds may be reduced as shown for the azo compounds and acylamino compounds hydrolyzed or previously mentioned.

All the above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogen-benzenesulfonic, toluenesulfonic, naphthalenesulfonic, or sulfanilic acid; methionine, tryptophan, lysine or arginine.

These or other salts, for example, the picrates, can also be used for the purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the above processes, in which an intermediate product obtainable at any stage thereof is used as starting material and any remaining steps are carried out, or the processes are discontinued at any stage thereof, or in which the starting materials are formed under the reaction conditions, or in which the reaction components are used in the form of their salts. For example, amines, alcohols or phenols may be used in the form of the alkali or alkaline earth metal salts, e.g. sodium potassium, magnesium, halomagnesium or calcium salts, and the nitrogen containing acid derivatives, e.g. imidic acid esters, in the form of their acid addition salts. Mainly, those starting materials should be used in the above reactions that lead to the formation of those compounds indicated as being specially valuable.

Starting materials or final products that are mixtures of isomers may be separated into single isomers by methods in themselves known. For example, compounds that contain one or more asymmetrical carbon atoms may be in the form of racemate mixtures, pure racemates or optical antipodes. Mixtures of racemates, by virtue of the physiochemical differences between the components, can be resolved into pure racemates, for example, by chromatography and/or fractional crystallization. Racemic products can likewise be resolved into the optical antipodes, for example, by reaction with optically active acids, separation of the diastereomeric salts and liberation of the bases from the salts.

The pharmacologically active compounds of the invention can be used, for example, for the manufacture of pharmaceutical compositions containing them in conjunction or admixture with inorganic or organic, solid or liquid pharmaceutical excipients, suitable for enteral, parenteral or topical administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions, or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75 percent, more particularly 1 to 50 percent of the active ingredient.

The following examples illustrate the invention and are not to be construed as being limitations thereon. Temperatures are given in degrees Centigrade, and all parts wherever given are parts by weight.

EXAMPLE 1

60 g N-[2-(2-amino-4,5-dimethoxy-phenyl)-ethyl]-benzamidine are dissolved in 1 liter toluene and the solution refluxed for 24 hours. It is then evaporated in vacuo, the residue dissolved in 500 ml ethanol and the solution saturated with hydrogen chloride. The precipitate formed upon cooling is filtered off and dried to yield the 2-phenyl-7,8-dimethoxy-4,5-dihydro-3H-1,3-benzodiazapine hydrochloride of the formula

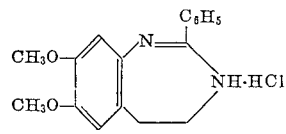

melting at 276°–278°.

The starting material is prepared as follows: The mixture of 80 g 2-(2-nitro-4,5-dimethoxy-phenyl)-ethylamine, 66 g benzimidic acid ethyl ester hydrochloride and 750 ml methanol is refluxed for 3 hours, then concentrated to 250 ml and the concentrate diluted with 1.5 liter diethyl ether. The yellow precipitate formed is filtered off and washed with diethyl ether to yield the N-[2-(2-nitro-4,5-dimethoxy-phenyl)-ethyl]-benzamidine hydrochloride melting at 235°–239°.

Eighty-five g thereof are dissolved in 1 liter methanol and hydrogenated at an initial pressure of 40 p.s.i. over 2 g platinum oxide at room temperature. After consumption of the theoretical amount of hydrogen, the mixture is filtered, the filtrate acidified with ethanolic hydrochloric acid, the solution combined with equal volume of diethyl ether and the precipitate formed filtered off; it represents the N-[2-(2-amino-4,5-dimethoxy-phenyl)-ethyl]-benzamidine dihydrochloride melting at 274°. 80 g thereof are dissolved in 2 liters of water and the solution made basic with concentrated aqueous ammonia. On cooling and scratching the corresponding base separates melting at 119°–122°.

EXAMPLE 2

The ethanolic solution containing the N-[2-(2-amino-4,5-dimethoxy-phenyl)-ethyl]-acetamidine hydrochloride (described below) is refluxed for 24 hours. The precipitate formed is filtered off and dried to yield the 2-methyl-7,8-dimethoxy-4,5-dihydro-3H-1,3-benzodiazepine hydrochloride of the formula

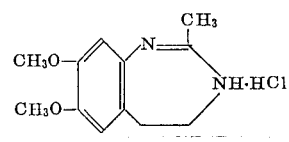

melting at 300°. It is dissolved in 100 ml water, the solution is made basic with 10 percent aqueous sodium hydroxide and extracted with chloroform. The extract is washed with water, dried and evaporated and the residue recrystallized from benzene to yield the corresponding free base melting at 110°–112°.

The starting material is prepared as follows: The mixture of 35 g 2-(2-nitro-4,5-dimethoxy-phenyl)-ethylamine, 44 g acetimidic acid ethyl ester hydrochloride and 300 ml methanol is refluxed for 3 hours and hereupon concentrated to about half of its volume. The concentrate is diluted with twice of its volume diethyl ether and the precipitate formed filtered off; it represents the N-[2-(2-nitro-4,5-dimethoxy-phenyl)-ethyl]-acetamidine hydrochloride melting at 240°–245°.

Thirty-nine g thereof are hydrogenated in 450 ml ethanol at an initial pressure of 40 p.s.i. over 2 g platinum oxide at room temperature. Hereupon the mixture containing the N-[2-(2-amino-4,5-dimethoxy-phenyl)-ethyl]-acetamidine hydrochloride, is filtered under nitrogen.

EXAMPLE 3

The butanolic solution containing the N-[2-(2-amino-4,5-dimethoxy-phenyl)-ethyl]-phenylacetamidine hydrochloride (described below) is refluxed for 20 hours under nitrogen. It is then concentrated to 400 ml and cooled. The precipitate formed is filtered off and dried to yield the 2-benzyl-7,8-dimethoxy-4,5-dihydro-3H-1,3-benzodiazepine hydrochloride of the formula

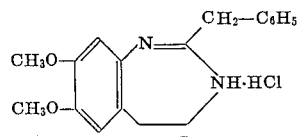

melting at 194°–196°.

The starting material is prepared as follows: To the solution of 15 g 2-(2-nitro-4,5-dimethoxy-phenyl)-ethylamine in 100 ml methanol, 13 g phenylacetimidic acid ethyl ester hydrochloride are added and the mixture is refluxed for 5 hours. It is cooled and the precipitate formed filtered off to yield the N-[2-(2-nitro-4,5-dimethoxy-phenyl)-ethyl]-phenylacetamidine hydrochloride melting at 220°–222°.

Twenty g thereof are hydrogenated in 400 ml ethanol at an initial pressure of 40 p.s.i. over 2 g platinum oxide at room temperature. Hereupon the mixture, containing the N-[2-(2-amino-4,5-dimethoxy-phenyl)-ethyl]-phenylacetamidine hydrochloride is filtered under nitrogen into 2 liters n-butanol. The filtrate is distilled in vacuo to remove the ethanol.

EXAMPLE 4

In the manner described in the previous Examples the following compounds are prepared by selecting the equivalent amount of the corresponding starting materials: 2-(4-chloro-phenyl)-, 2-(3-methyl-phenyl)-, 2-(3,5-dimethoxy-phenyl)-, 2-(4-trifluoromethyl-phenyl)-, 2-methoxymethyl-, 2-dimethylamino-methyl-, 2-(2-dimethylamino-ethyl)-, 2-cyclopropylmethyl- and 2-methylamino-7,8-dimethoxy-4,5-dihydro-3H-1,3-benzodiazepine hydrochloride as well as 2-phenyl-, 2-methyl-, 2-dimethylaminomethyl- and 2-(2-dimethylamino-ethyl)-4,5-dihydro-3H-1,3-benzodiazepine hydrochloride.

EXAMPLE 5

The solution of 1.0 g 2-phenyl-7,8-dimethoxy-4,5-dihydro-3H-1,3-benzodiazepine in 25 ml toluene is refluxed for 3 hours on the water trap and under nitrogen. Hereupon it is cooled and 2.5 ml of a 1.6 molar n-butyl lithium solution in hexane are added with stirring and stirring is continued for 30 minutes. Then 0.5 ml methyl p-toluenesulfonate are added and the mixture is allowed to stand overnight at room temperature. It is combined with water, extracted with chloroform, the extract dried and evaporated. The residue is triturated with diethyl ether, the precipitate formed filtered off and recrystallized from ethanol to yield the 2-phenyl-3-methyl-7,8-dimethoxy-4,5-dihydro-3H-1,3-benzodiazepine of the formula

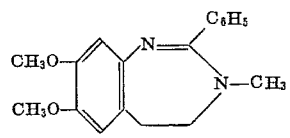

melting at 150°–152°.

EXAMPLE 6

In the manner described in Example 5, but replacing the 2-phenyl-7,8-dimethoxy-4,5-dihydro-3H-1,3-benzodiazepine by the equivalent amount of 2-methyl-7,8-dimethoxy-4,5-dihydro-3H-1,3-benzodiazepine, the 2,3-dimethyl-7,8-dimethoxy-4,5-dihydro-3H-1,3-benzodiazepine is prepared. It is dissolved in the minimum amount of ethanol and the solution acidified with ethanolic hydrochloric acid. On cooling the corresponding hydrochloride separates. It is recrystallized from ethanol and melts at 267°–269°.

EXAMPLE 7

To the tetrahydrofuran solution containing the 2-(2-amino-4,5-dimethoxy-phenyl)-ethylamine (described below), 14.5 g N,N'-diimidazolyl-carbonyl are added and the mixture allowed to stand at room temperature for 12 hours and finally refluxed for 2 hours. The cold suspension is filtered and the residue recrystallized from about 10 liters water to yield the 2-hydroxy-7,8-dimethoxy-4,5-dihydro-3H-1,3-benzodiazepine of the formula

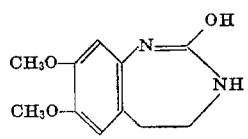

melting at 244°–247°.

In the analogous manner the 2-hydroxy-4,5-dihydro-3H-1,3-benzodiazepine is prepared.

The starting material is obtained as follows:

Twenty g 2-(2-nitro-4,5-dimethoxy-phenyl)-ethylamine are hydrogenated in 350 ml tetrahydrofuran over 2 g platinum oxide at an initial pressure of 40 p.s.i. and at room temperature. The suspension is then filtered under nitrogen.

EXAMPLE 8

To the solution of 4.0 g N-methyl-(2-amino-phenyl)-acetamide in 60 ml tetrahydrofuran 4 g N,N'-diimidazolyl-carbonyl are added and the mixture is stirred at room temperature for 3 hours. It is then filtered, the residue washed with tetrahydrofuran and dried to yield the 2-hydroxy-3-methyl-4-oxo-4,5-dihydro-3H-1,3-benzodiazepine of the formula

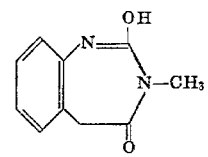

melting at 268°–269°.

EXAMPLE 9

The methanolic solution containing the N-[2-(2-amino-4,5-dimethoxy-phenyl)-ethyl]-methoxyacetamidine hydrochloride (described below) is diluted with 510 ml n-butanol, concentrated until the vapor reaches the boiling point of n-butanol and then refluxed overnight under nitrogen. The mixture is then concentrated in vacuo and upon cooling and scratching the 2-methoxymethyl-7,8-dimethoxy-4,5-dihydro-3H-1,3-benzodiazepine hydrochloride of the formula

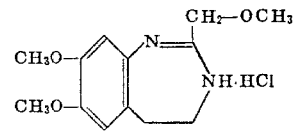

separates, melting at 214°–216°.

The starting material is prepared as follows: To the solution of 5.0 g 2-(2-nitro-4,5-dimethoxy-phenyl)-ethylamine in 50 ml methanol. 3.5 g methoxyacetimidic acid ethyl ester hydrochloride are added and the mixture is refluxed for 3 hours. Hereupon it is evaporated in vacuo, the residue triturated with ethyl acetate and the solid formed filtered off; it represents the N-[2-(2-nitro-4,5-dimethoxy-phenyl)-ethyl]-methoxy-acetamidine hydrochloride melting at 189°–193°.

22.0 g thereof are hydrogenated in 200 ml methanol at an initial pressure of 46 p.s.i. over 1.0 g platinum oxide at room temperature and the mixture obtained filtered under nitrogen.

EXAMPLE 10

2.0 g 2-phenyl-3-methyl-7,8-dimethoxy-4,5-dihydro-3H-1,3-benzodiazepine are dissolved in the minimal amount of warm ethanol and the solution acidified by bubbling hydrogen chloride through. Upon cooling the hydrochloride separates, melting at 267°–268°.

EXAMPLE 11

To the mixture of 24 g imidazole and 125 ml chloroform, the solution of 10 g thiophosgene in 125 ml benzene is added while cooling. It is filtered and the filtrate added to the tetrahydrofuran solution, containing the 2-(2-amino-4,5-dimethoxy-phenyl)-ethylamine (described below), and the mixture is refluxed for 3 hours. It is cooled, filtered and the residue recrystallized from dimethylformamide-ethyl acetate, to yield the 2-mercapto-7,8-dimethoxy-4,5-dihydro-3H-1,3-benzodiazepine of the formula

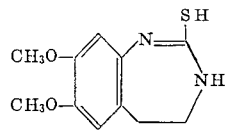

melting at 251°–253°.

The starting material is preferred as follows: 10 g -2-(2-nitro-4,5-dimethoxy-phenyl)-ethylamine in 50 ml tetrahydrofuran are hydrogenated over 1 g platinum oxide at 45 p.s.i. and the suspension is filtered under nitrogen.

EXAMPLE 12

The mixture of 2.5 g N-methyl-N-[2-(2-nitro-4,5-dimethoxy-phenyl)-ethyl]-benzamidine hydrochloride, 50 ml ethanol and 0.5 g platinum oxide is hydrogenated at room temperature and 45 p.s.i. until the theoretical amount of hydrogen has been absorbed. It is filtered under nitrogen, the filtrate evaporated in vacuo, the residue dissolved in the minimum amount of water and the solution made strongly basic with saturated aqueous potassium hydroxide. It is extracted with chloroform, the extract dried, filtered and evaporated in vacuo. The residue is taken up in ethanol, the solution acidified with ethanolic hydrochloric acid and the precipitate formed after concentration filtered off, to yield the 2-phenyl-3-methyl-7,8-dimethoxy-4,5-dihydro-3H-1,3-benzodiazepine hydrochloride melting at 267° – 268°; it is identical with the compound obtained according to Example 10.

The starting material is prepared as follows: The mixture of 5.0 g N-methyl-2-(2-nitro-4,5-dimethoxy-phenyl)-ethylamine, 3.9 g ethyl benzimidate hydrochloride and 25 ml ethanol is refluxed for 17 hours. It is then evaporated, the residue tritur-ated with ethylacetate and then with chloroform, to yield, after filtration, the N-methyl-N-[2-(2-nitro-4,5-dimethoxy-phenyl)-ethyl]-benzamidine hydrochloride melting at 218°–219°.

EXAMPLE 13

The mixture of 2.0 g 2-phenyl-7,8-dimethoxy-4,5-dihydro-3H-1,2-benzodiazepine, 50 ml benzene and 1.0 g methyl iodide is refluxed for 1 hour. After cooling, the precipitate formed is filtered off, to yield the 1,3-dimethyl-2-phenyl-7,8-dimethoxy- 4,5-dihydro-3H-1,3-benzodiazepinium iodide of the formula

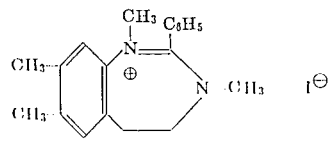

melting at 187°.

EXAMPLE 14

The solution of 18.0 g 2-chloromethyl-7,8-dimethoxy-4,5-dihydro-3H-1,3-benzodiazepine hydrochloride in the minimum amount of water is made strongly basic with saturated aqueous potassium hydroxide while cooling in an ice bath. The precipitate formed is filtered off, are dried and recrystallized from benzene to yield the corresponding free base melting at 126°. The mixture of 12.3 g thereof and 50 ml saturated methanolic dimethylamine is refluxed for 2 hours. It is then evaporated, the residue dissolved in the minimum amount of ethanol, the solution acidified with ethanolic hydrochloric acid and the precipitate formed filtered off, to yield the 2-dimethylamino-methyl-7,8-dimethoxy-4,5-dihydro-3H-1,3-benzodiazepine dihydrochloride mono-hydrate of the formula

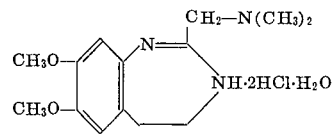

melting at 248°–250°.

In the analogous manner the 2-piperidinomethyl-7,8-dimethoxy-4,5-dihydro-3H-1,3-benzodiazepine dihydrochloride, m.p. 273° – 275°, and the 2-(1-imidazolyl)-methyl-7,8-dimethoxy-4,5- dihydro-3H-1,3-benzodiazepine dihydrochloride, m.p. 269° – 271°, and the 2-(4-phenyl-piperazino)-methyl-7,8-dimethoxy-4,5-dihydro-3,H-1,3-benzodiazepine dihydrochloride, m.p. 228°, are prepared from equivalent amounts of the corresponding starting material.

EXAMPLE 15

Five g 2-mercapto-7,8-dimethoxy-4,5-dihydro-3H-1,3-benzo-diazepine are dissolved in 100 ml dimethylformamide. The solution is then cooled, 2 ml methyl iodide are added while stirring, and the mixture is allowed to stand overnight at room temperature. It is diluted with diethyl ether, the oil separated triturated with diethyl ether and recrystallized from ethanol, to yield the 2-methylmercapto-7,8-dimethoxy-4,5-dihydro-3H-1,3-benzodiazepine hydroiodide of the formula

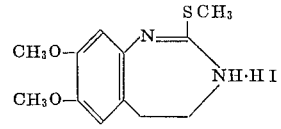

melting at 209°–211°.

EXAMPLE 16

To the solution of 1.8 g N-methyl-2-(2-amino-4,5-dimethoxy-phenyl)-ethylamine in 50 ml tetrahydrofuran, 1,5-g N,N-di-imidazolyl-carbonyl are added and the mixture is allowed to stand at room temperature overnight. It is then refluxed for 3 hours, concentrated, and the precipitate formed filtered off. It is recrystallized from ethanol to yield the 2-hydroxy-3-methyl-7,8-dimethoxy-4,5-dihydro-3H-benzodiazepine of the formula

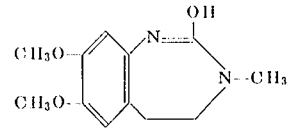

melting at 197° to 199°.

EXAMPLE 17

To the tetrahydrofuran solution containing the 2-(2-amino-4,5-diisobutoxy-phenyl)-ethylamine (described below), 6.5 g N,N-diimidazolyl-carbonyl are added and the mixture is stirred overnight at room temperature and finally refluxed for 6 hours. The precipitate formed is filtered off to yield the 2-hydroxy-7,8-diisobutoxy-4,5-dihydro-3H-1,3-benzodiazepine of the formula

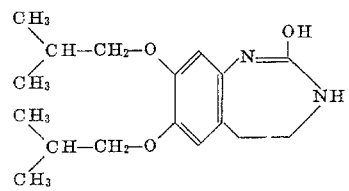

melting at 280°–285°.

The starting material is prepared as follows: To the mixture of 38 g of a 50 percent sodium hydride suspension in mineral oil and 200 ml dimethylsulfoxide, the solution of 55.2 g 3,4-dihydroxy-benzaldehyde in 400 ml dimethylsulfoxide is added dropwise while cooling and stirring. The mixture is then heated on the steam bath and 120 g isobutyl bromide are added dropwise while stirring, and stirring is continued overnight at the steam bath. After cooling, the mixture is diluted with water, extracted with diethyl ether, the extract washed with 10 percent aqueous sodium hydroxide and water, dried, filtered and evaporated. The residue is distilled and the fraction boiling at 149°–155°/0.06–0.07 mm Hg collected. It solidifies on standing and is recrystallized from hexane to yield the 3,4-diisobutoxy-benzaldehyde melting at 40°–42°.

The mixture of 48 g thereof, 15 g ammonium acetate, 16 ml nitromethane and 140 ml acetic acid is refluxed for 2 hours. After cooling the precipitate formed is filtered off and washed with acetic acid and water to yield the β-nitro-3,4-diisobutoxy-styrene, melting at 122°–124°.

The solution of 40 g thereof in 500 ml tetrahydrofuran is added dropwise to the mixture of 16 g lithium aluminumhydride in 300 ml diethyl ether while stirring. Hereupon the mixture is stirred for an additional hour and the excess reducing agent decomposed with water. It is filtered, the residue washed with tetrahydrofuran and the filtrate evaporated to yield the 2-(3,4-diisobutoxy-phenyl)-ethylamine as an oil.

The solution of 38 g thereof in 200 ml ethanol is neutralized by the dropwise addition of concentrated nitric acid. It is then evaporated, the residue dissolved in the minimum amount of diethyl ether and upon stirring in the cold a precipitate separates, which is filtered off and dissolved in 100 ml trifluoroacetic acid. The solution is heated on the steam bath for 15 minutes, then evaporated and the residue triturated with diethyl ether to yield the 2-(2-nitro-4,5-diisobutoxy-phenyl)-ethylamine trifluoroacetate, melting at 170°–172°. It is dissolved in the minimum amount of water, the solution made basic with aqueous sodium hydroxide, extracted with tetrahydrofuran and the extract evaporated to yield the corresponding free base.

Twelve g thereof are dissolved in 100 ml tetrahydrofuran and hydrogenated over 1 g platinum oxide at 45 p.s.i. initial pressure. The mixture is then filtered under nitrogen to yield the desired solution of the starting material.

EXAMPLE 18

The ethanolic solution containing the 2-(2-amino-4,5-dimethoxy-phenyl)-ethylamine (described below) and 9.5 g ethyl 4-trifluoromethyl-benzimidate hydrochloride (m.p. 125°) is refluxed for 20 hours and then evaporated. The residue is recrystallized from methanol-ethanol to yield the 2-(4-trifluoromethyl-phenyl)-7,8-dimethoxy-4,5-dihydro-3H-1,3-benzodiazepine hydrochloride of the formula

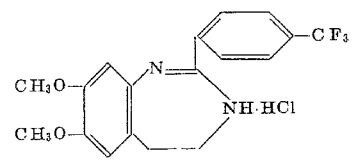

melting at 281°–282°.

The starting material is prepared as follows: The solution of 8.0 g 2-(2-nitro-4,5-dimethoxy-phenyl)-ethylamine in 200 ml ethanol is hydrogenated over 1.0 g platinum oxide and an initial pressure of 45 p.s.i. After consumption of the theoretical amount of hydrogen the mixture of filtered under nitrogen.

EXAMPLE 19

The mixture of 25.0 g 2-hydroxy-7,8-dimethoxy-4,5-dihydro-3H-1,3-benzodiazepine and 25 ml phosphorus oxychloride is heated to 95°–100° for 1 hour. It is cooled, diluted with ethyl acetate and the precipitate formed filtered off. It is added portion-wise to 200 ml liquid ammonia and the mixture allowed to evaporate at room temperature. The residue is dissolved in hot water, the solution made basic with saturated aqueous potassium hydroxide, the supernatant solution decanted off and the precipitate dissolved in methylene chloride. The solution is dried, evaporated, the residue dissolved in ethanol and the solution acidified with ethanolic hydrochloric acid to yield the 2-amino-7,8-dimethoxy-4,5-dihydro-3H-1,3-benzodiazepine hydrochloride of the formula

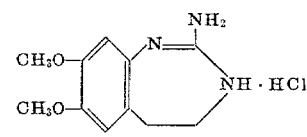

melting at 233°.

EXAMPLE 20

The mixture of 10 g 2-(2-amino-4,5-dimethoxy-phenyl)-ethylamine, 200 ml toluene and 13.1 g N-phenyl-veratric acid amidine is refluxed for 46 hours and evaporated in vacuo. The residue is taken up in the minimum amount of ethanol and the solution acidified with ethanolic hydrochloric acid. The precipitate formed is filtered off and recrystallized from water to yield the 2-(3,4-dimethoxy-phenyl)-7,8-dimethoxy-4,5-dihydro-3H-1,3-benzodiazepine hydrochloride monohydrate of the formula

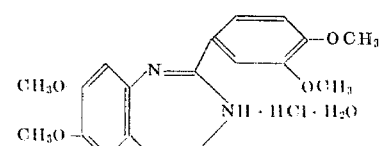

melting at 224°–225°.

In the analogous manner, the 2-(3,4,5-trimethoxyphenyl)-7,8-dimethoxy-4,5-dihydro-3H-1,3 benzodiazepine hydrochloride monohydrate, melting at 165°–167°, is prepared from equivalent amounts of the corresponding starting materials.

The starting material is prepared as follows: The mixture of 100 g veratric acid, 250 ml chloroform and 45 ml thionyl chloride is heated at the steam bath until the hydrogen chloride evolution ceases. It is evaporated in vacuo, the residue dissolved in 2 liters tetrahydrofuran, and 120 ml aniline are added while stirring. Stirring is continued for 2 hours at room temperature, the precipitate formed filtered off and washed with tetrahydrofuran. The filtrate is evaporated in vacuo and the residue recrystallized from methanol to yield the N-phenyl-veratric acid amide melting at 168°–169°.

The mixture of 70 g thereof and 250 ml thionyl chloride is refluxed for 5 hours and evaporated in vacuo, to yield the N-phenyl-veratric acid imidchloride melting at 155°–158°.

Through the solution of 30 g thereof in 1 liter tetrahydrofuran, ammonia is bubbled until the solution becomes alkaline. The precipitate formed is filtered off, washed with tetrahydrofuran and the filtrate evaporated in vacuo, to yield the N-phenyl-veratric acid amidine, which is used as such without further purification.

EXAMPLE 21

The mixture of 2.0 g N-[2-(2-nitro-4,5-dimethoxyphenyl)-ethyl]-4-trifluoromethyl-benzamidine hydrochloride, 50 ml ethanol and 0.5 g platinum oxide is hydrogenated at room temperature and 45 p.s.i. until the theoretical amount of hydrogen has been absorbed. It is filtered under nitrogen, the filtrate evaporated in vacuo, the residue dissolved in the minimum amount of water and the solution made strongly basic with saturated aqueous potassium hydroxide. The mixture is extracted with chloroform, the extract dried, filtered and evaporated. The residue is taken up in the minimum amount of toluene, the solution refluxed for 24 hours and evaporated in vacuo. The residue is taken up in the minimum amount of ethanol, the solution acidified with ethanolic hydrochloric acid and the precipitate formed recrystallized from methanol-ethanol, to yield the 2-(4-trifluoromethyl-phenyl)-7,8-dimethoxy-4,5-dihydro-3H-1,3-benzodiazepine hydrochloride melting at 281°–282°; it is identical with the compound obtained according to Example 18.

The starting material is prepared as follows: To the solution of 150 g 4-trifluoromethyl-benzonitrile in 700 ml anhydrous diethyl ether, 75 ml anhydrous ethanol are added and dry hydrogen chloride is bubbled through the stirred mixture at 0° until saturation is reached. Upon addition of diethyl ether to a small sample, some crystals are obtained, which are used to seed the main batch; the latter is allowed to stand overnight in the refrigerator. The precipitate formed is filtered off and washed with diethyl ether to yield the 4-trifluoromethyl-benzimidic acid ethyl ester hydrochloride melting at 128°.

To the solution of 10 g thereof in 100 ml ethanol, 11.2 g 4-trifluoromethyl-benzimidic acid ethyl ester hydrochloride are added and the whole is stirred and refluxed for 16 hours. The mixture is evaporated in vacuo, the residue triturated with ethyl acetate and recrystallized from ethanol to yield the N-[2-(2-nitro-4,5-dimethoxy-phenyl)-ethyl]-4-trifluoromethyl-benzamidine hydrochloride melting at 200°–202°.

The second starting material is prepared as follows: The solution of 190 g 2-(3,4-dimethoxy-phenyl)-ethylamine in 2 liters isopropanol is neutralized by the dropwise addition of concentrated nitric acid while stirring and cooling in an ice bath. The precipitate formed is filtered off, washed with isopropanol and diethyl ether and dried to yield the corresponding nitrate melting at 152°–154° dec.).

Two forty g thereof are added portionwise to 1 liter trifluoroacetic acid while stirring, whereby the temperature is allowed to rise to about 70°. Hereupon the mixture is evaporated in vacuo, the residue dissolved in 1.5 liter ethyl acetate and the solution acidified with saturated hydrogen chloride in ethyl acetate. The precipitate formed is filtered off, washed with ethyl acetate and diethyl ether and recrystallized from ethanol, to yield the 2(2-nitro-4,5-dimethoxy-phenyl)-ethylamine hydrochloride melting at 240°. It is dissolved in the minimum amount of water, the solution made strongly basic with aqueous potassium hydroxide, the mixture extracted with chloroform, the extract dried, filtered and evaporated to yield the corresponding base which melts, after recrystallization from diethyl ether, at 104°–108°.

In the analogous manner, the following starting materials are prepared:

a. 4-ethyl-benzimidic acid ethyl ester hydrochloride, m.p. 113°–114°.
b. 4-isopropyl-benzimidic acid ethyl ester hydrochloride, m.p. 110°–111°.
c. 4-tolyl-acetimidic acid ethyl ester hydrochloride, m.p. 133°, and
d. 2-(2-nitro-4,5-diethoxy-phenyl)-ethylamine hydrochloride, m.p. 222°–224°.

EXAMPLE 22

In the manner described in the previous Examples, the following hydrochlorides of compounds having Formula III, are prepared from equivalent amounts of the corresponding starting material; they are all recrystallized from ethanol.

| $R_{10}$ | $R_{11}$ | m.p. |
|---|---|---|
| $CH_3$ | $CH_3$ | 267°–269° |
| $CH_2Cl$ | H | 282° |
| 4—$CH_3O$—$C_6H_4$—$CH_2$ | H | 204°–205° |
| 3,4—$(CH_3O)_2$—$C_6H_3$—$CH_2$ | H | 192°–194° |
| 4—OH—$C_6H_4$ | H | 300°–302° |
| 3—$CH_3O$—$C_6H_4$ | H | 140°–144° |
| 4—$CH_3O$—$C_6H_4$ | H | 243° |
| 4—$C_2H_5O$—$C_6H_4$ | H | 225°–227° |
| 3—F—$C_6H_4$ | H | 257°–259° |
| 4—F—$C_6H_4$ | H | 281°–286° |
| 3—Cl—$C_6H_4$ | H | 157°–163° (hydrate) |
| 4—Cl—$C_6H_4$ | H | 273°–276° |
| 3—$CF_3$—$C_6H_4$ | H | 237°–239° |
| 3—$NO_2$—$C_6H_4$ | H | 262°–264° |
| 4—$NO_2$—$C_6H_4$ | H | 200° |
| 3—HOOC—$C_6H_4$ | H | 285°–288° |
| 3—$C_2H_5OOC$—$C_6H_4$ | H | 134°–137° |
| 4—$C_2H_5OOC$—$C_6H_4$ | H | 251°–253° |
| 4—$(CH_3)_2N$—$SO_2$—$C_6H_4$ | H | 250°–252° |

The starting material useful in the preparation of the compounds of Formula I is prepared according to the methods previously described, by using equivalent amounts of the corresponding intermediates. Said material has the formula

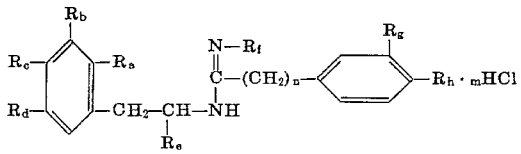

| $R_a$ | $R_b$ | $R_c$ | $R_d$ | $R_e$ | $R_f$ | $R_g$ | $R_h$ | n | m | m.p. °C | recr. from |
|---|---|---|---|---|---|---|---|---|---|---|---|
| NH₂ | H | OCH₃ | OCH₃ | H | H | H | CH₃ | 0 | 2 | 285–287 | A |
| NH₂ | H | OCH₃ | OCH₃ | H | H | H | OCH₃ | 0 | 2 | 281–283 | A |
| NO₂ | H | OCH₃ | OCH₃ | H | H | H | CH₃ | 1 | 1 | 219–220 | A |
| NO₂ | H | OCH₃ | OCH₃ | H | H | H | CH₃ | 0 | 1 | 223–225 | A |
| NO₂ | H | OCH₃ | OCH₃ | H | H | CH₃ | H | 0 | 1 | 207–211 | C |
| NO₂ | H | OCH₃ | OCH₃ | H | H | CH₃ | CH₃ | 0 | 1 | 236–238 | C |
| NH₂ | H | OCH₃ | OCH₃ | H | H | H | i—C₃H₇ | 0 | 1 | 197–199 | D |
| NH₂ | H | OCH₃ | OCH₃ | H | H | H | OCH₃ | 0 | 1 | 200 | B |
| NH₂ | H | OCH₃ | OCH₃ | H | H | H | Cl | 0 | 1 | 235–239 | B |
| NH₂ | H | OCH₃ | OCH₃CH₃ | H | H | | CH₃ | 0 | 1 | 218–220 | AD |
| NH₂ | H | OCH₃ | OCH₃ | H | CH₃ | H | CH₃ | 0 | 1 | 198–200 | AD |
| NO₂ | OCH₃ | H | OCH₃ | H | H | H | CH₃ | 1 | 2 | 258–259 | AD |
| NO₂ | H | OCH₃ | OCH₃ | H | H | H | COOH | 0 | 1 | 254–255 | C |
| NO₂ | H | OC₂H₅ | OC₂H₅ | H | H | H | CH₃ | 0 | 1 | 210–212 | B |
| NO₂ | H | OH | OCH₃ | H | H | H | CH₃ | 0 | 1 | 215–218 | AD |
| NO₂ | H | OCH₃ | OH | H | H | H | CH₃ | 0 | 1 | 222–224 | AD |
| NO₂ | H | OCH₂—C₆H₅ | OCH₃ | H | H | H | CH₃ | 0 | 1 | 237–240 | AD |
| NO₂ | H | OCH₃ | OCH₂—C₆H₅ | H | H | H | CH₃ | 0 | 1 | 228– | AD |

A = methanol, B = ethanol, C = i-propanol, D = acetonitrile

Another starting material is prepared as follows: To the solution of 3.1 g 2-(2-nitro-4,5-diisobutoxy-phenyl)-ethylamine in 100 ml dimethylformamide, 1.9 g 3-thiophene-carboximidic acid ethyl ester hydrochloride are added and the mixture stirred overnight at 80°. It is then evaporated in vacuo, the residue triturated with acetone and diethyl ether and recrystallized from ethanol to yield the N-[2-)24,5-diisobutoxy-phenyl)-ethyl]-3-thiophenecarboxamidine hydrochloride of the formula

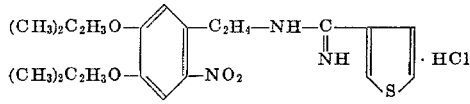

showing in the I.R.-spectrum, inter alia bands at 1610 and 1665 cm⁻¹.

Method b) for the preparation of compounds having Formula IV is illustrated by the following procedure: To the solution of 14.2 g 2-(2-nitro-4,5-dimethoxyphenyl)-ethylamine in 250 ml tetrahydrofuran, cooled to 0°, the solution of 5.0 g 4-toluyl chloride in 250 ml tetrahydrofuran is added dropwise while stirring. The precipitate formed is filtered off, the filtrate evaporated in vacuo, the residue triturated with ethyl acetate and recrystallized from ethanol to yield the N-[2-(2-nitro-4,5-dimethoxy-phenyl)-ethyl]-4-methyl-benzamide, melting at 169°–171°.

The mixture of 10.0 g thereof and 50 ml phosphorus oxychloride is refluxed for 5 hours and evaporated in vacuo. 10.0 g of the resulting N-[2-(2–nitro-4,5-dimethoxy-phenyl)-ethyl]-4-methyl-benzimidoyl chloride are dissolved in 250 ml tetrahydrofuran and ammonia is bubbled through the stirred solution while keeping the temperature at 0°. After the mixture turns basic, the precipitate formed is filtered off, dissolved in the minimum amount of ethanol and the solution acidified with ethanolic hydrochloric acid. The precipitate formed is filtered off and recrystallized from methanol-ethanol to yield the N-[2-(2-nitro-4,5-dimethoxyphenyl)-ethyl]-4-methyl-benzamidine hydrochloride, melting at 223°–225°.

EXAMPLE 23

Preparation of 10,000 tablets each containing 100 mg of the active ingredient:

| Material: | |
|---|---|
| 2-(3-nitro-phenyl)-7, 8-dimethoxy-4,5-dihydro-3H-1,3-benzodiazepine hydrochloride | 1,000.0 g |
| Lactose | 2,535.0 g |
| Talcum powder | 150.0 g |
| Magnesium stearate | 40.0 g |
| Corn starch | 125.0 g |
| Polyethylene glycol 6,000 | 150.0 g |
| Purified water | q.s. |

PROCEDURE

All the powders are passed through a screen with openings of 0.6 mm. Then the drug substance, lactose, talcum, magnesium stearate and one-half of the starch are mixed in a suitable mixer. The other one-half of the starch is suspended in 50 ml water and the suspension added to the hot solution of the polyethylene glycol in 180 ml water. The paste formed is added to the powders, which are granulated, if necessary, with an additional amount of water. The granulate is dried overnight at 35°, broken on a screen with 1.2 mm openings and compressed into tablets using con-cave punches with 10.3 mm diameter, uppers bisected.

In the analogous manner tablets are prepared, using about 50 to 150 mg of the compounds of Formula III, in which $R_{10}$ is methyl, piperidinomethyl, benzyl, 4-methoxy-benzyl, phenyl, 4-methoxy-phenyl or 4-nitro-phenyl and $R_{11}$ is hydrogen or therapeutically acceptable acid addition salts thereof.

EXAMPLE 24

Preparation of 1,000 tablets each containing 500 mg of the active ingredient:

| Formula: | |
|---|---|
| N-[2-(2nitro-4,5-dimethoxy-phenyl)-ethyl]-4-methyl-benzamide hydrochloride | 500.0 g |
| Wheat starch | 96.8 g |
| Magnesium aluminum silicate | 20.0 g |
| Methylcellulose | 13.3 g |
| Stearic acid | 13.3 g |
| Colloidal silica | 6.6 g |
| Anhydrous ethanol | q.s. |
| Purified water | q.s. |

PROCEDURE

All powders with the exception of the silica and starch are passed through a screen having openings of 0.6 mm and mixed well. From the starch and 65 ml water a paste is formed which is used to granulate the powders together with the ethanol. The wet granulate is passed through a screen with 2 mm openings and dried overnight at 35°. The dry granulate is broken in a hammer mill, passed through a screen with 1.2 mm openings and compressed into tablets each weighing 0.65 g, using concave punches with 12 mm diameter, uppers bisected.

EXAMPLE 25

Preparation of 10,000 tablets each containing 50.0 mg of the active ingredient:

Formula:
| | |
|---|---|
| N-methyl-N'-[2-(3,4-dimethoxy-phenyl)-ethyl]-4-methyl-benzamidine hydrochloride | 500.00 g |
| Lactose | 1,706.00 g |
| Corn starch | 90.00 g |
| Polyethylene glycol 6,000 | 90.00 g |
| Talcum powder | 90.00 g |
| Magnesium stearate | 24.00 g |
| Purified water | q.s. |

PROCEDURE

All the powders are passed through a screen with openings of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

We claim:
1. A compound having the formula

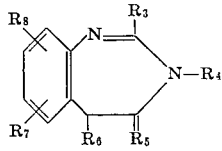

in which $R_3$ is hydrogen, pyrrolidino, piperidino, piperazino, N-lower alkyl-piperazino, imidazolyl, morpholino, thiamorpholino, lower alkyl, lower alkenyl, (halogeno, lower alkoxy, di-lower alkylamino, pyrrolidino, piperidino, piperazino, N-lower alkyl-piperazino, N-phenylpiperazino, imidazolyl, morpholino or thiamorpholino)-lower alkyl, $R_9$ or $R_9$-lower alkyl, $R_4$ is hydrogen, or lower alkyl, $R_5$ stands for two hydrogens, hydrogen and lower alkyl or oxo, $R_6$ is hydrogen, or lower alkyl, each of $R_7$ and $R_8$ is hydrogen, lower alkyl, or lower alkoxy and $R_9$ is phenyl, mono- or di-(lower alkyl)-phenyl, mono-(hydroxy)-phenyl, mono-, di- or tri-(lower alkoxy)-phenyl, mono-(halogeno)-phenyl, mono-(trifluoromethyl)-phenyl, mono-(nitro)-phenyl, mono-(di-lower alkylamino)-phenyl, mono-(carboxy)-phenyl, mono-(carbo-lower alkoxy)-phenyl or mono-(di-lower alkylsulfamoyl)-phenyl, the N-oxide, a lower alkyl-quaternary or a therapeutically acceptable acid addition salt thereof.

2. A compound as claimed in claim 1, and having the formula

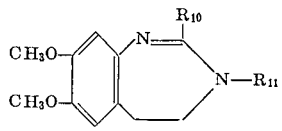

in which $R_{10}$ is amino, methyl, chloromethyl, methoxymethyl, dimethylaminomethyl, piperidinomethyl, 4-phenyl-piperazinomethyl, benzyl, mono- or dimethoxy-benzyl, 2-imidazolylmethyl, phenyl, mono- or dimethyl-phenyl, i-propyl-phenyl, hydroxy-phenyl, mono-, di or trimethoxy-phenyl, ethoxy-phenyl, fluoro-phenyl, chloro-phenyl, trifluoromethyl-phenyl, nitro-phenyl, carboxy-phenyl, carbethoxy-phenyl or dimethylsulfamoyl-phenyl, $R_{11}$ is hydrogen or methyl, or a therapeutically acceptable acid addition salt thereof.

3. A compound as claimed in claim 2, in which formula $R_{10}$ is methyl, piperidinomethyl, benzyl, 4-methoxy-benzyl, phenyl, 4-methoxy-phenyl, 3- or 4-nitro-phenyl or 3-carboxy-phenyl and $R_{11}$ is hydrogen, or a therapeutically acceptable acid addition salt thereof.

4. A compound as claimed in claim 1 and being the 2-(3-nitro-phenyl)-7,8-dimethoxy-4,5-dihydro-3H-1,3-benzodiazepine or a therapeutically acceptable acid addition salt thereof.

* * * * *

PO-1050
(5/69)

UNITED STATES PATENT OFFICE
CERTIFICATE OF CORRECTION

Patent No. 3,681,340                    Dated August 1, 1972

Inventor(s) HERMAN ROBERT RODRIGUEZ ET AL

It is certified that error appears in the above-identified patent and that said Letters Patent are hereby corrected as shown below:

Cover page, insert --- [73] Assignee: CIBA-GEIGY Corporation, Ardsley, New York ---.

Column 21, line 1 after the structural formula, after "hydrogen," insert --- amino, mono- or di-lower alkylamino, ---.

Signed and sealed this 18th day of June 1974.

(SEAL)
Attest:

EDWARD M. FLETCHER, JR.
Attesting Officer

C. MARSHALL DANN
Commissioner of Patents